United States Patent

[11] 3,603,241

| [72] | Inventor | Doris Drucker |
| | | 138 N. Mountain Ave., Montclair, N.J. 07042 |
| [21] | Appl. No. | 11,058 |
| [22] | Filed | Feb. 13, 1970 |
| [45] | Patented | Sept. 7, 1971 |

[54] AUTOMATIC FOOD HANDLING APPARATUS
10 Claims, 4 Drawing Figs.

[52] U.S. Cl. ................................................. 99/335
[51] Int. Cl. .................................................. A47j 41/00
[50] Field of Search ...................................... 99/334–335, 282–283, 326–327, 328–329, 331–332, 333, 340; 312/270, 274, 62, 220, 221, 222, 126

[56] References Cited
UNITED STATES PATENTS

| 2,700,723 | 1/1955 | Lynch | 99/332 X |
| 2,700,724 | 1/1955 | Lynch | 99/332 X |
| 2,764,664 | 9/1956 | Stewart | 312/270 UX |
| 2,853,205 | 9/1958 | Boyd | 99/332 UX |
| 3,191,590 | 6/1965 | Haley | 99/331 X |
| 3,267,835 | 8/1966 | Romano et al. | 99/334 |
| 3,353,476 | 11/1967 | Goodman et al. | 99/328 |

*Primary Examiner*—Billy J. Wilhite
*Assistant Examiner*—Arthur O. Henderson
*Attorney*—Alfred E. Miller ABSTRACT: A heat insulating container for the cold storage of food in the interior of the oven of a cooking stove including a clock controlled automatic starter. Upon actuation of the heating elements of the oven the cover of the container is removed, and the food is transferred therefrom into the oven without participation of a human operator.

THERMOSTAT

CLOCK AND TIMER

INVENTOR

BY

ATTORNEY

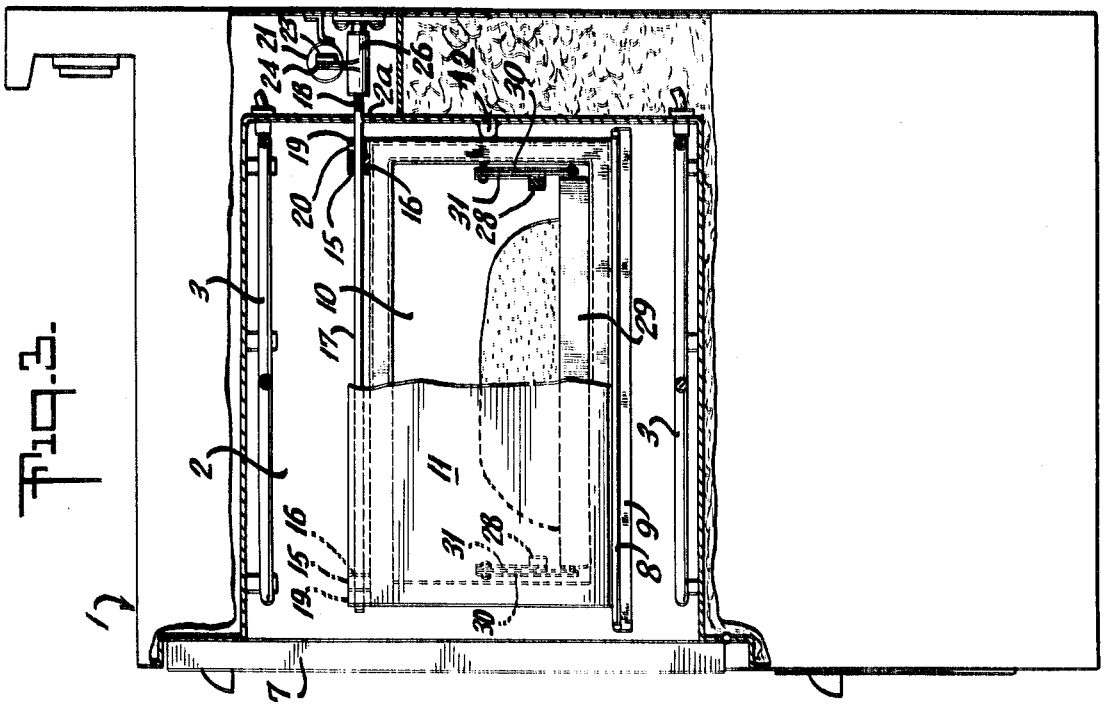
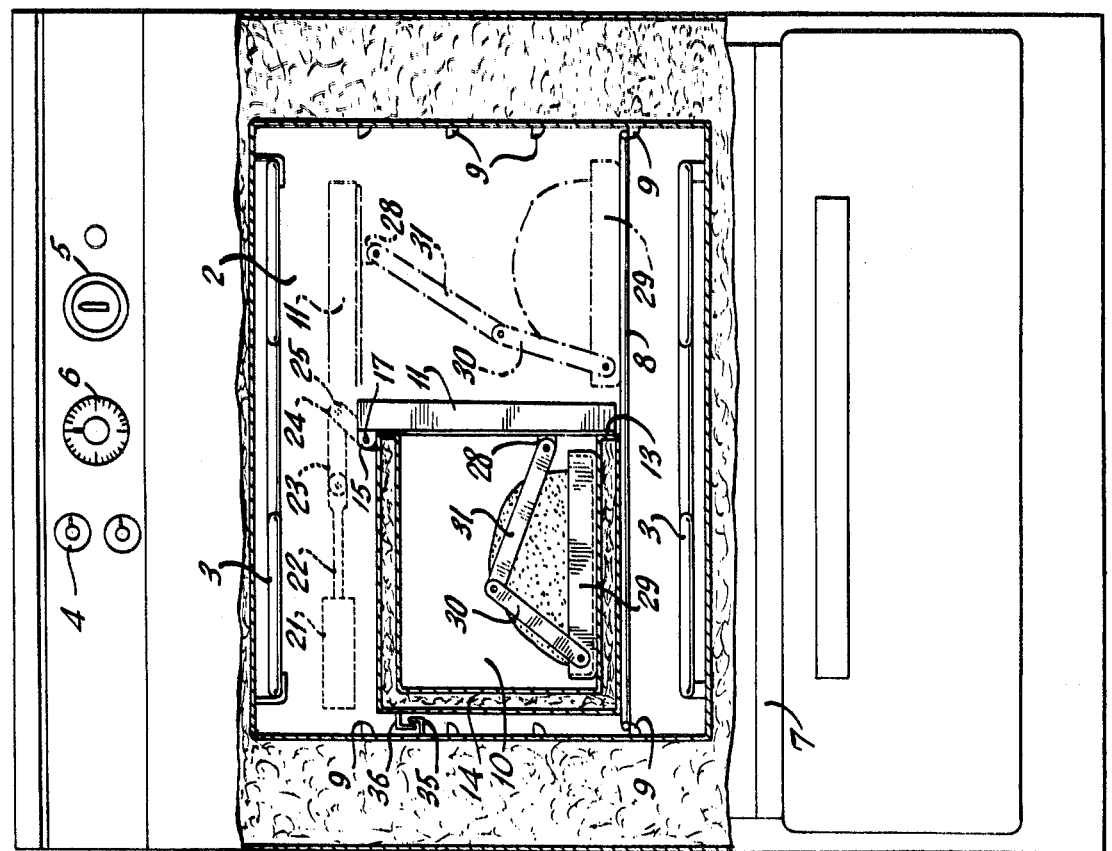

3,603,241

AUTOMATIC FOOD HANDLING APPARATUS

The present invention relates to an apparatus for transferring food from storage to an oven and, more particularly, transferring food from cold storage into an oven without human participation.

Ovens of domestic cooking stoves with automatic starting and stopping timers, and with temperature controls, have been available commercially for some time. The ovens generally comprise an electric clock which is connected to a switch; at an adjustably preset time the switch closes a circuit to actuate the heating elements. Prior to or at the start of the heating process the ovens are loaded by a human operator. In the case of nonperishable food the time interval between loading the oven and starting the heating elements is of no consequence, but perishable food such as fresh meat, poultry, fish, casseroles containing milk, eggs, cheese, mayonnaise, etc. cannot safely remain for several hours in a closed oven at room temperature without circulation of air. Public health authorities stress that such food must be kept in cold storage until it is actually cooked because it is subject to spoilage and to the growth of toxic organisms while it is exposed to a temperature of 22° C. or above as is common in the average house.

While, theoretically, an oven with automatic start and stop timers makes it unnecessary for the homemaker to intervene, the appliance is of limited value for housekeeping individuals who must be away from home all day, that is, in particular for working wives who would benefit most from a fully automated process. If these women transfer perishables from the refrigerator to the oven in the morning before they leave for work, in anticipation of the heating time in the afternoon, they risk the likelihood of toxic contamination of the food through salmonella or other harmful organisms; an alternate solution, for example, a quick trip home to load the oven shortly before the predetermined heating time, is in most cases impractical or impossible.

Prior art, as exemplified by U.S. Pat. No. 3,353,476, has suggested an appliance combining the functions of a refrigerator and an oven which would solve the problem. Clock-controlled signals deenergize the refrigerating elements and energize the heating unit at the predetermined time.

An appliance of this type is very expensive to build and to use. The refrigerating components including compressor, motor, pump, etc. are used only for several hours out of a 24-hour day, and only for a small part of the bulk of edibles and potables which are normally stored in a household refrigerator. To raise the temperature from approximately 0° C. to an average cooking temperature of 180–200° C., and to lower it again in anticipation of the following load, consumes a large amount of energy. Furthermore, the repeated temperature fluctuations over so wide a range require expensive structural elements of great mechanical strength and thermal expansivity in order to avoid an early breakdown.

It is, therefore, the primary object of the present invention to obviate the drawbacks of prior art by providing an inexpensive apparatus for transferring food from cold storage into an oven without the intervention of a human operator.

Another object is to synchronize the transfer of food from cold storage with the start of the oven-heating process which is actuatable by clock-controlled signals.

A further object is to eliminate the risk of food spoilage and to avoid waste.

Yet another object is to provide a safe and sanitary apparatus for the aforementioned purposes.

SUMMARY OF THE INVENTION

These objects and others which will become apparent hereinafter are attained, in accordance with the present invention, through a heat-insulating container which is removably positioned inside a conventional oven comprising a clock-controlled starting device. Cold food is placed inside the container which is subsequently latched to prevent transfer of heat from the environment to the food. Upon actuation of the heating elements of the oven the container is opened and the food is automatically released into the oven.

According to a more specific feature of the invention the container includes a hinged cover which is displaceable at a preselected time by a solenoid plunger connected to the control circuit for the oven. In one preferred embodiment a thermostat actuates a mechanism for the opening of the container when a predetermined oven temperature has been attained.

The food in the interior of the container rests in a tray or pan which is linked to the cover, and which slides into the oven when the cover is removed.

The container as well as the cover are made from heat-resistant material and comprise two substantially parallel walls enclosing therebetween insulating or cooling material. The wall surface proximate the food is nonpourous and washable. In one preferred embodiment the insulating or cooling material, which is permanently or removably introduced between the double walls, is replaced by a vacuum.

The above and other objects, features and advantages of my invention will become more readily apparent from the following description, reference being made to the accompanying drawing.

BRIEF DESCRIPTION OF THE DRAWING

FIG. 2 is a front elevational view showing the container in the closed position in full lines and in the open position in dot-and-dash lines in accordance with the present invention;

FIG. 3 is a side elevational view, partly in section, of the embodiment shown in FIG. 2.

DESCRIPTION OF THE PREFERRED EMBODIMENTS

Figure 1:
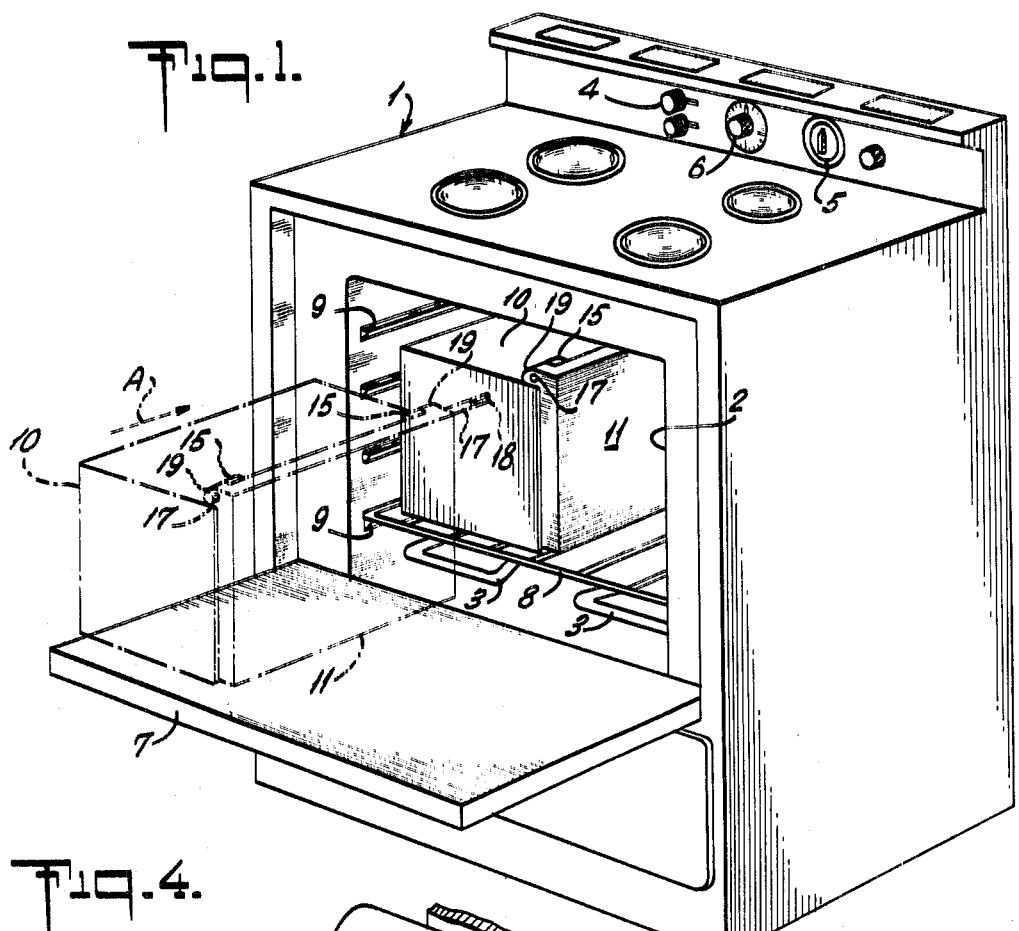
FIG. 1 is a perspective view of an embodiment of my invention with container shown being placed in oven in dot-and-dash lines.

In FIG. 1, I show a cooking stove 1 including an oven 2 and an oven door 7 of conventional type. At least one heating element 3 in the interior of oven 2 is connected to an outside source of electricity, gas or a similar energy supply. The heating element 3 is adapted to be turned on, respectively off, by manual operation of a switch 4 or automatically, upon signals issuing from control devices such as a thermostat 5 and/or a timer 6 which may be connected with a clock, as is well known. A removable rack 8 for holding cooking utensils inside the oven 2 is supported on its outer edges on ledges 9 which are affixed to the oven walls. A hollow box-shaped, open-ended container 10 is insertable into the oven 2 in the direction of arrow A (dashed lines), until its rear wall abuts against a stop means 12 which is secured to the rear wall of the oven. The open end of the container 10, which is parallel with a sidewall of the oven 2, can be closed by a cover 11, pivotably attached at its upper end to the container, as will be described hereinafter. Spring-biased closure means 13, well known to one skilled in the art, are provided at the lower part of cover 11 to hold it in place against the container 10 in the closed position and to prevent a heat exchange between the interior of the container and the ambient air. In order to provide adequate space for opening the cover 11, the width of the container 10 must be less than half the width of the oven 2; there are no limitations with respect to the depth and height of the container except the dimensions of the oven into which it must fit.

The container 10 and the cover 11 comprise substantially parallel walls enclosing insulating material 14 such as mineral wool, vermiculite, foamed plastic, gases, or water solutions of various concentrations of glycol, etc. In one preferred embodiment a vacuum is sealed in between the double walls.

A pair of parallel flanges 28 are attached to the inner wall of cover 11 and extend normally thereto into the interior of the container 10. The distance between the flanges 28 is proportional to the width of a cooking pan or tray 29 which is slidably disposed inside the container 10. A pair of parallel linkages, each of which is formed by the arms 30, 31 connects the tray 29 with the flanges 28, respectively with the cover 11. One end of each of the arms 30 is pivotably attached to either side of tray 29, and one end of each of the arms 31 is pivotably attached to one of the flanges 28; at their free ends the arms 30, 31 are pivotably connected with each other.

A pair of arcuate bosses or ears 19, each surrounding a central opening, are attached in parallel alignment with the flanges 28 to the upper edge of cover 11, so that the outer portion of each boss is flush with the lateral edge of the cover. A threaded passage 20a leads from the central opening of each boss 19 to the exterior. The bosses 19 bracket a pair of tubular bosses 15 which are colinearly affixed to the upper surface of the container 10 proximate its open end. One end of each of the bosses 19 is adjacent to one end of each of the bosses 15 which are spaced from each other. An axial bore 16 is provided in each of the bosses 15 and 19. A shaft 17, having a length greater than the depth of the container 10 is rotatably disposed in the straight channel formed by the bores 16 and the juxtaposed central openings of the bosses 19 on either side of the container. Projecting beyond the rear wall of container 10, the shaft 17 terminates in a spline 18. A set screw 20 which is inserted into the passage 20 a, abuts at its end in the interior of the bore 16 against the shaft 17.

Figure 4:
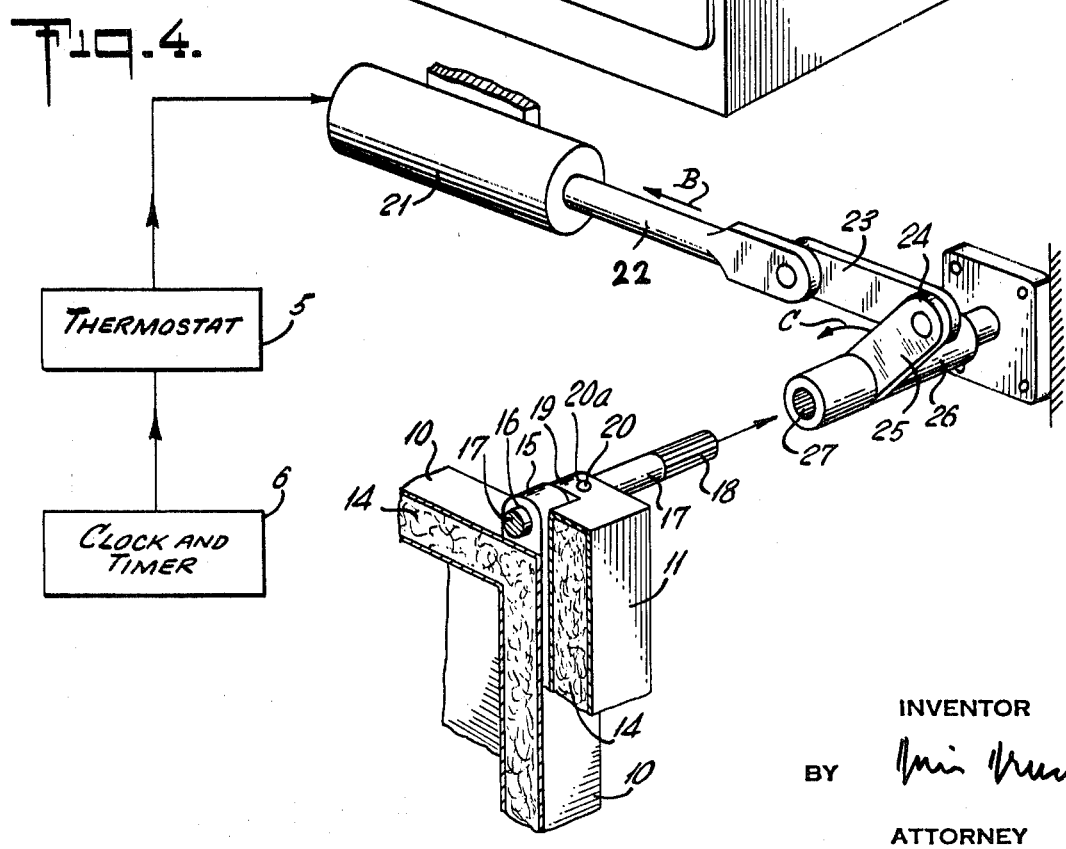
FIG. 4 is a fragmentary perspective view of the operating components for the removal of the container cover.

To operate the mechanism, the container 10, loaded with food and closed with the cover 11, is placed on a rack 8 inside the oven 2, the spline 18 is introduced into the splined bore 27 of sleeve 26, through an opening 2a in the oven wall and an L-shaped projection 35, attached to the sidewall of the oven is engaged by a complementary L-shaped projection 36 which is affixed to the adjacent outside wall of the container so as to guide 18 into 27. The oven controls 5, 6 are set to turn the oven 2 on, respectively off, at a predetermined time and to regulate the temperature during the cooking process. A signal which may be, for example, the start of the heating period or the attainment of a preselected oven temperature, causes the solenoid 21 to be energized and to attract the plunger 22 as well as the arm 23 of the bell crank 24 in the direction of arrow B (FIG. 4). Linear movement of arm 23 induces counterclockwise rotational movement of arm 25, sleeve 26 and shaft 17 (arrow C, FIG. 4). The rotation of shaft 17 is transmitted by the screw 20 to the cover 11 which undergoes an angular displacement of 90° (dashed lines, FIG. 2). The movement of the cover 11 pulls the arms 30, 31 upwards and outwards and causes the tray 29 containing the food to slide out of the container 10 onto the oven rack 8. A lateral displacement of the container 10 during removal of the loaded tray 29 is checked by the anchoring hooks 35, 36. Through a suitable dimensioning of the components of the mechanism, the placement of the interacting parts, or the tensioning of the springs in the closure member 13, the opening of the container 10 and the removal of the tray 29 therefrom can be made to proceed gradually and smoothly, so that an abrupt jolting of the tray and of the food is avoided.

It is to be understood that the automatic food handling apparatus as described heretofore may be combined with ovens using conventional fuels as well as microwaves or ultrasonic devices or other means for the generation of heat.

I claim:

1. A combination of an automatic food-handling apparatus and an oven having at least one heating element and at least one control member and means for actuating said heating element upon a signal from said control member, comprising a heat-insulating open-ended container for the storage of cold food, said container having an opening leading to the interior thereof, a heat-insulating cover adapted to be moved from a first position closing said opening to a second position uncovering said opening, a latching assembly securing said cover to said container in said first position, and means for moving said cover from said first to said second position upon actuation of said heating elements, whereby said food is discharged from said container into said oven without human participation.

2. The apparatus as defined in claim 1 wherein said oven control member is a clock connected with a timer.

3. The apparatus as defined in claim 1 wherein said oven control member is a thermostat.

4. The apparatus as defined in claim 1 wherein said cover is pivotably attached to said container.

5. The apparatus as defined in claim 1 comprising a food receptacle slidably disposed in said container, and linkage means connecting said receptacle and said cover, said linkage means including a pair of pivotable arms on either side of said receptacle.

6. The apparatus as defined in claim 1 comprising a solenoid, a circuit connecting said solenoid and said oven control member, and a plunger mounted for sliding movement toward said solenoid upon a signal from said oven control member.

7. The apparatus as defined in claim 6 including means for translating the linear motion of said plunger into rotational motion of said cover whereby said cover is movable from said first to said second position.

8. The apparatus as defined in claim 1 wherein said container and said cover comprise a double-jacketed casing having two substantially parallel walls made of heat-resistant material and enclosing a chamber adapted to receive a heat-insulating substance.

9. The apparatus as defined in claim 1 wherein said container and said cover comprise a double-jacketed casing having two substantially parallel walls made of heat-resistant material and enclosing an evacuated space between said walls.

10. The apparatus as defined in claim 1 wherein said container is releasably disposed in said oven.